United States Patent [19]

Tanner, Jr.

[11] Patent Number: 5,765,939
[45] Date of Patent: Jun. 16, 1998

[54] WALL MOUNTING FOR NEON LIGHTS

[75] Inventor: Walter Keisler Tanner, Jr., Chesnee, S.C.

[73] Assignee: Fallon Luminous Products Corporation, Spartanburg, S.C.

[21] Appl. No.: 599,644

[22] Filed: Feb. 12, 1996

Related U.S. Application Data

[63] Continuation-in-part of Ser. No. 389,314, Feb. 16, 1995, Pat. No. 5,541,823.

[51] Int. Cl.⁶ .................................. F21S 3/14; F21S 3/00
[52] U.S. Cl. .......................... 362/219; 362/217; 362/218; 362/222; 362/223; 362/224; 362/225; 362/260; 362/373
[58] Field of Search .................................. 362/219, 217, 362/218, 222, 223, 224, 225, 260, 263, 264, 267, 373, 375

[56] References Cited

U.S. PATENT DOCUMENTS

| | | | |
|---|---|---|---|
| 2,434,951 | 1/1948 | Netting | 362/217 |
| 4,858,087 | 8/1989 | Hartshorn | 362/219 |
| 4,994,944 | 2/1991 | Vernondier | 362/238 |
| 5,113,328 | 5/1992 | Foster et al. | 362/222 |
| 5,124,896 | 6/1992 | Bentley | 362/223 |
| 5,386,353 | 1/1995 | Battaglia | 362/224 |
| 5,390,094 | 2/1995 | Evanisko | 362/267 |
| 5,499,170 | 3/1996 | Gagne | 362/84 |
| 5,613,759 | 3/1997 | Ludwig et al. | 362/149 |
| 5,658,067 | 8/1997 | Engle et al. | 362/222 |

FOREIGN PATENT DOCUMENTS

| | | |
|---|---|---|
| 222004 | 9/1958 | Australia . |
| 189716 | 5/1956 | Austria . |

Primary Examiner—Ira S. Lazarus
Assistant Examiner—Ljiljana V. Ciric
Attorney, Agent, or Firm—Hardaway Law Firm P.A.

[57] ABSTRACT

Improved structures for housing assemblies for illuminated glass tubing are provided with this invention which comprises a housing assembly with a base section having wall portions forming an elongated channel having an open side; a central section having wall portions forming an elongated channel having an open side; and a light-transmitting cover section having wall portions forming an elongated channel having an open side; the central section secured to the cover section to form a light unit, the light unit being shorter than the base section; an elongated support plate for glass tubing, the wall portions of the central section including means adjacent the open side of the central section channel for supportably receiving the support plate in the channel; and the wall portions of the base section and the central section including means for securing the central section to the base section in snap-fit relation to close said open sides of said channels; whereby the longitudinal position of the light unit on the base section may vary based upon where on the base section the light unit is secured. These structures include better venting and drainage of the cover section of the assembly.

17 Claims, 11 Drawing Sheets

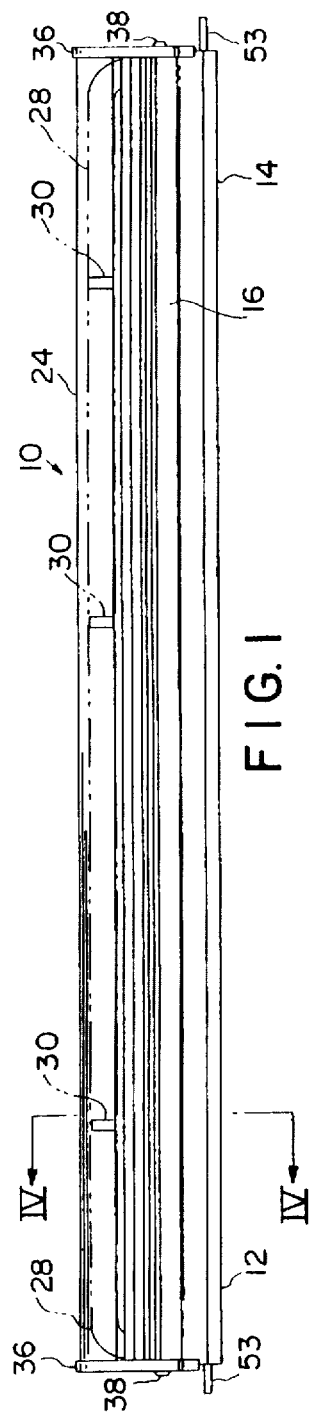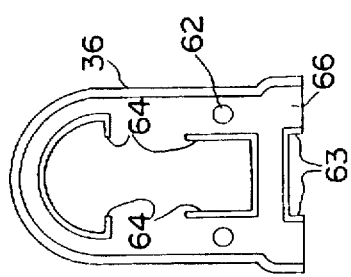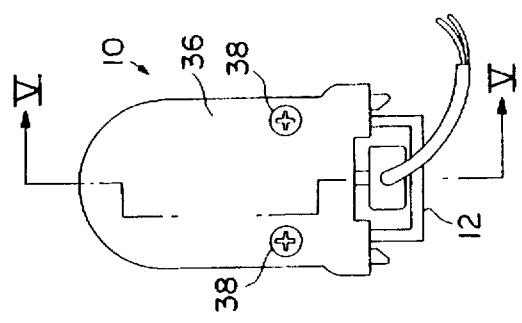

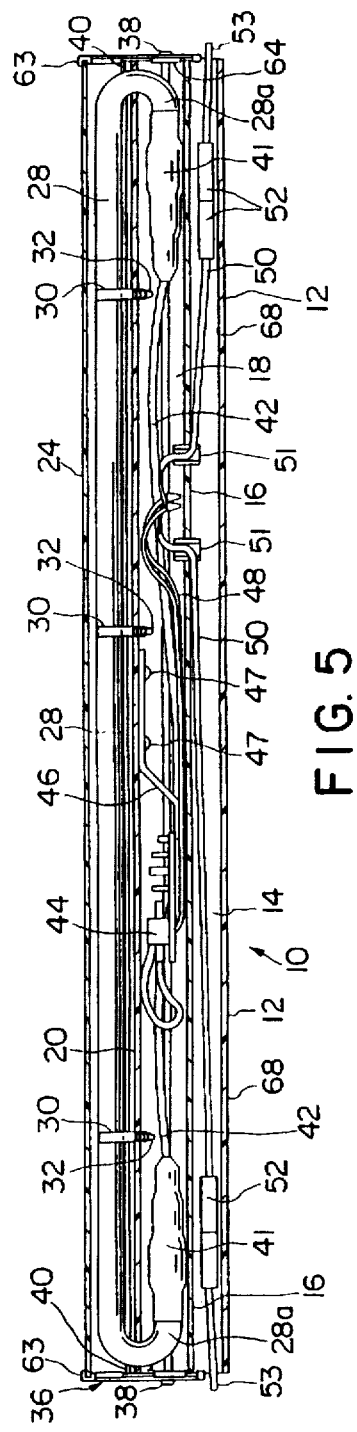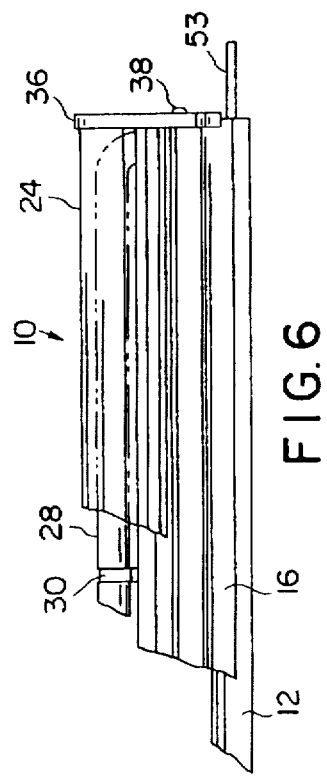

WALL MOUNTING FOR NEON LIGHTS

RELATED APPLICATION

This application is a continuation-in-part of U.S. Ser. No. 08/389,314, filed Feb. 16, 1995, now U.S. Pat. No. 5,541,823, issued Jul. 30, 1996.

BACKGROUND OF THE INVENTION

Luminous electric lighting of the inert gas-filled tube type have long been employed in commercial and business establishments to provide decoration and illumination. Typically, neon lighting has been used in outdoor environments to outline and highlight various structures, such as buildings, amusement rides, display signs, and the like.

In the use of neon tubing to highlight or outline buildings and other structures in both indoor and outdoor locales, it is desirable to protect the tubing from breakage and to enclose the electrical components thereof from weather and contamination. The present invention is thus directed to a housing assembly for containing and protecting such neon tubing and its associated electrical components and wiring which may be easily attached to support surfaces to provide decoration and illumination.

BRIEF OBJECTS OF THE PRESENT INVENTION

It is an object of the present invention to provide a housing assembly for protective support of illuminated glass tubing which is of simplified and economical construction.

It is another object to provide a housing assembly for illuminated glass tubing which virtually eliminates degradation in operation by reducing the effects of condensation in the transparent section.

It is a further object to provide a housing assembly in which when a series of glass tubing lighting elements are used, they provide the user with the effect of continuous illumination.

It is a further object to provide a unitized modular continuous lighting system that may be mounted in multiple positions upon a base section.

It is still a further object of the invention to provide a unitized modular continuous lighting system that allows for the easy mounting of multiple systems in a parallel configuration.

It is still a further object to provide a housing assembly for protective support of illuminated glass tubing wherein the assemblies may be easily and simply installed on a supporting surface by workmen requiring no specialized training.

BRIEF DESCRIPTION OF THE DRAWINGS

FIG. 1 is a side elevation view of a housing assembly for protective support of illuminated glass tubing according with the present invention;

FIG. 2 is an enlarged right end view of the housing assembly of FIG. 1 showing the outside surface of an end cap of the assembly;

FIG. 3 is an elevation view of the inside surface of an end cap of the housing assembly;

FIG. 5 is a sectional elevation view of the housing assembly taken generally along the indicated lines V—V of FIG. 2, and looking in the direction of the arrows thereof;

FIG. 6 is an enlarged, broken-away side elevation view of the right-side end portion of the housing of FIG. 1;

SUMMARY OF THE INVENTION

Figure 4:
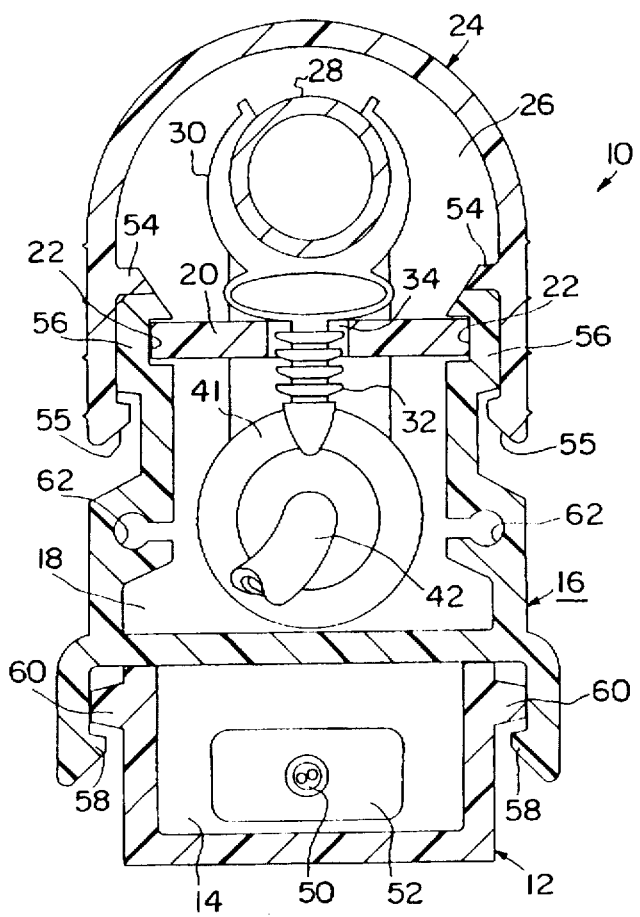
FIG. 4 is an enlarged cross-sectional view of the housing assembly of FIG. 1, with left-hand end cap removed, taken generally along line IV—IV of FIG. 1, and looking in the direction of the arrows.

The invention comprises a multicompartment housing assembly for protective support of illuminated glass tubing of the neon tube type formed of a base section, a central section, and a transparent cover section, each having wall portions forming an open-sided elongated channel. Together with their associated elements, the central and transparent sections form a light unit independent of the base section. A support plate mounted in the central section has fastening clips which support elongated glass tubing in the cover section for illumination of an area. The base, central, and cover sections are formed of resiliently deformable material, such as extruded plastic, and the sections are assembled in snap-fit relation with each other to enclose the open sides of the respective channels. End caps partially close ends of the cover and central channels to protect the glass tubing and electrical transformer and wiring means disposed in the cover and central sections against weather and the effects of condensation. Furthermore, by properly constructing the end caps, a plurality of housing assemblies may be interconnected in series and powered from a single low voltage power source to provide decoration and lighting to a desired area in which the effect of continuous lighting is created.

DETAILED DESCRIPTION OF PREFERRED EMBODIMENTS

As described in this application's parent and referring more particularly to the drawings, the housing assembly 10 for protective support of illuminated glass tubing of the present invention includes a mounting base section 12 having wall portions forming an open-sided elongated channel 14, a central section 16 having wall portions forming an open-sided elongated channel 18, an elongated flat support plate 20 slidably received and supported in opposed elongated grooves 22 located adjacent the open side of central section channel 18, and a cover section 24 having a wall of generally semi-circular shape forming an open-sided elongated channel 26. (Note particularly FIG. 4.) In the embodiment of this application's parent, it was envisioned that base section 12 will be slightly shorter than central section 16 so that, as will be described below, end caps 36 seal off the channel of base section 12.

The components of the housing assembly 10 preferably are formed of a suitable resiliently deformable material, such as plastic, which are molded into the configurations shown. For economical and simple fabrication, the mounting base section 12, central section 16, and cover section 24 each are of constant cross-sectional shape along their lengths, enabling the formation of the sections in a conventional extrusion molding operation. (See FIG. 4). The plastic material employed for the housing conveniently may be LEXAN®. The housing assembly sections may be extruded in varying lengths, as desired, and end caps 36 of rigid plastic are fixed to adjacent end portions of the central and cover sections of the assembly by screws 38, thus allowing the central and cover assemblies to be partially open to the atmosphere to eliminate the accumulation of condensation.

The mounting base section 12, central section 16, support plate 20, and end caps 36 are generally opaque, while the cover section 24 is generally transparent or translucent in order to transmit light from the illuminated glass tubing 28.

Located inside the cover section 24 is elongated glass tubing 28 of the neon-tube type. The tubing 28 is supported in the housing by means of a plurality of tube-engaging clips 30 of resiliently deformable material which are attached to support plate 20 by means of a deformable threaded projection 32 which is fictionally received in and extends through openings 34 in the support plate.

As best seen in FIGS. 4 and 5, the length of glass tubing 28 is supported in snap-fit relation in each of the clips 30 and end portions 28a of the tubing are bent, as in a glass heating operation, to extend downwardly from the cover section channel through openings 40 in support plate 20 into the channel 18 of the central section 16 (FIGS. 4 and 5). The ends of the glass tubing are electrically connected, as by electrodes 41, through transformer output wiring 42 to transformer means 44 which is attached by means of a mounting bracket 46 with fastening screws 47 to the underside of support plate 20 (FIG. 5). The transformer means 44 is in turn connected by means of wiring 48 to a length of jumper wiring 50 located in the mounting base section channel of the housing. One end of the jumper wiring sections 50 extends through small openings in the lower wall of the central section for connection to the wiring 48 and the ends are fictionally secured therein by wire strain relief elements 51. The other ends of the jumper wiring are provided with electrical connection sockets 52 to be attached by additional short lengths of jumper wiring 53 to a power supply and/or jumper wiring in next adjacent housing assemblies of a lighting array.

Figure 7:
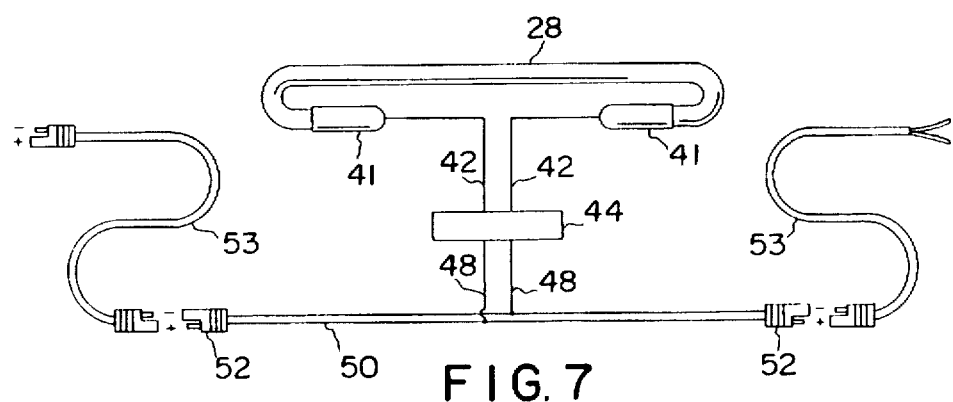
FIG. 7 is a wiring diagram of the illuminated glass tubing of the housing assembly, showing schematically the electrical connections and components supplying low voltage power to the illuminated tubing of housing assembly.

FIG. 7 shows schematically the interconnection of the electrical components of the housing assembly 10 to supply power to the illuminated tubing therein. As illustrated, power may be supplied from a suitable power source such as a low voltage DC power supply (not shown) by way of jumper wiring sections 53, 50 and wiring 48 to conventional transformer means 44 of a type suitable to convert the low voltage DC power source to the high voltage power sufficient to electrify and illuminate the inert gas or gases in the tubing 28. Power is supplied to the gas-filled tubing 28 by way of transformer output wiring 42 and electrodes 41 connected to the ends of the tubing.

Component sections 12, 16 and 24 of the housing assembly are easily assembled and interconnected by frictional engagement of the sections with each other. As best seen in FIGS. 4 and 6, lower side wall portions of cover section 24 of the housing assembly 10 project downwardly and have an upper shoulder 54 and lower protrusion 55 which receive and engage an elongated outer shoulder 56 on the upper wall edges of the central section 16 in snap-fit, frictional relations, such that the open sides of the channels of the cover section 24 and central section 16 are closed from weather contamination. The channels of the cover section communicate through the openings 40 (FIG. 5) in the ends of support plate 20 through which the tubing 28 passes. Through this interconnection, it can be seen that central section 16, cover section 24, and their associated hardware form a light unit independent of base section 12.

In a similar manner, lower wall portions of central section 16 of the assembly project downwardly and have inward protrusions 58 which receive elongated shoulders 60 on the outer upper wall of mounting base section 12 in snap-fit, frictional engagement to close the open side of the mounting base channel 14. Located in opposed relation on the inner surface of the wall portions of the central section 18 of the housing assembly are passageways, the open ends 62 (FIG. 4) which receive the threaded screws 38 to secure the end caps of the housing assembly to the ends of the housing sections.

As best seen in FIG. 3, with our previous design, the inside surface of each of the end caps 36 of the housing assembly has peripheral and internal protruding ribs, as at 63 and 64, which engage the ends of sections 12, 16, and 24 to provide positional support and strength to the cover, central and base support sections of the assembly when the end caps are attached thereto. Thus, there is only one proper mounting position for the light unit on base section 12. Another way of saying this is that a particular base section 12 is dedicated to a particular length light unit. To further seal the channels of the cover and central sections of the assembly, the inner surface of the end cap may be provided with insulation material, such as foam rubber pad 66.

Figures 10, 11A, 11B:
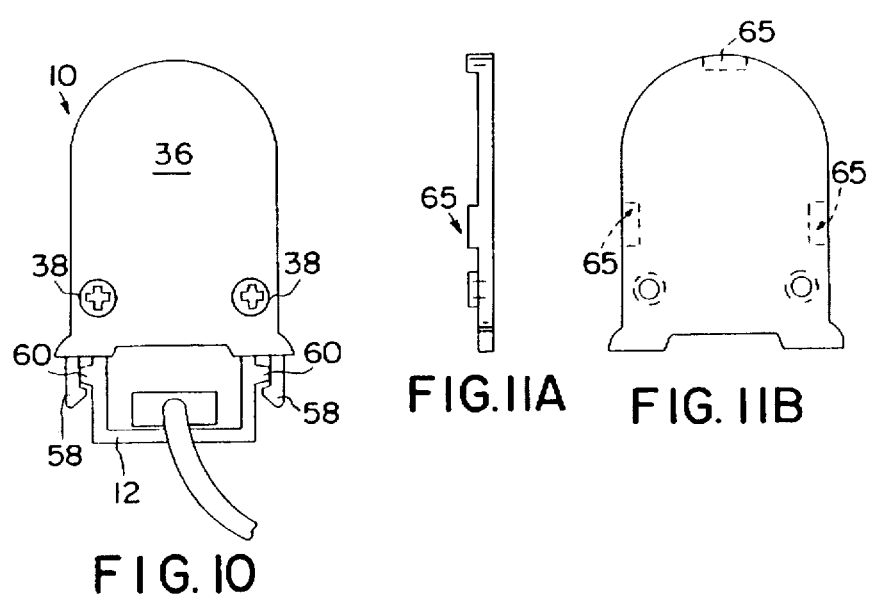
FIG. 10 is an end view showing a modified end cap structure according to the instant invention.
FIGS. 11A and 11B are side and end views respectively of an improved end cap.

However, we have determined that even with this insulation, some condensation becomes trapped within cover section 24, causing degradation in light clarity, brightness, and sharpness. To alleviate this problem, end caps 36 should be spaced a small distance from the ends of sections 16 and 24. To achieve this, as shown in FIGS. 11A and B, multiple spacer tabs 65, on the order of approximately 0.1" thick, are used. This creates radial gaps small enough to prohibit damaging amounts of moisture, other elements, and insects to enter the light unit but is large enough to allow air in to prevent condensation. Mounting screws 38 pass through holes 62'. Because there are gaps about the entire perimeter of the light unit, water drainage is achieved regardless of position (orientation) of the light unit. This is advantageous in situations where the light moves, as when attached to amusement park rides. This drainage and gap feature is a substantial improvement over prior art sealed light units such as those made by United States Neon.

A further improvement to previous designs is that section 12 is now made substantially longer than sections 16 and 24. Furthermore, as shown in FIG. 10, end caps 36 now have a profile in which they do not extend down beneath the highest point of base section 12. With this structure, there is no one proper position for mounting the light unit, i.e., sections 16 and 24, to base section 12. Thus, an installer may position the light unit anywhere that light is needed. This allows an unskilled worker to install the light because base section 12 does not have to be positioned in exactly the right place. One may merely mount base section 12 to a support surface, secure the light unit, i.e., sections 16 and 24, to base section 12, and then vary the longitudinal position of the light unit with respect to base section 12 until it is in the right position. Again, this is a substantial improvement over the light units such as those made by United States Neon, which require the careful and arduous mounting of clamp straps.

Figure 12:
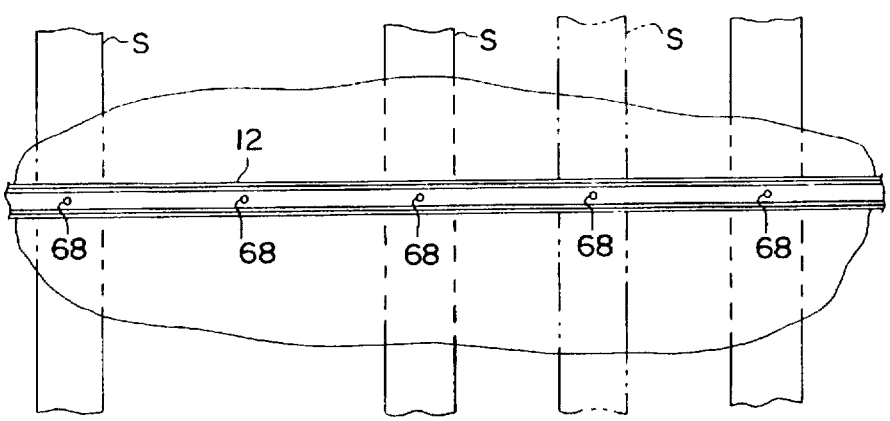
FIG. 12 shows how, by properly selecting the distance between fastener holes on the base section, the base section may be easily mounted on studs which are conventionally spaced.

For easier mounting of the above-mentioned longer base sections 12, as shown in FIG. 12, fastener holes 68 should be placed every 8" along base 12 with the first hole 68 being 3½ inches from the end of base 12. With this construction, after the center of the first stud S in the support surface is found, the remaining fastener holes 68 may be readily secured to stud supports, whether the stud-to-stud center distance is 16" (shown in solid) or 24" (shown in phantom). This greatly reduces the difficulty in mounting base 12 to a support surface. When multiple bases 12 are used, they should be spaced apart one (1) inch to allow for expansion due to changes in temperature. This base structure 12 also allows for light units to be shorter than the stud-to-stud distance. Where the base structure 12 is not supported by studs, there is a risk of damage to the support surface due to the weight of the light units.

Figure 8:
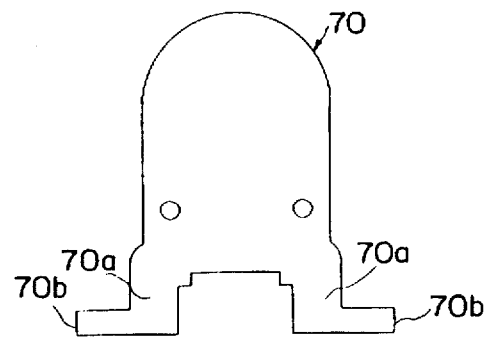
FIG. 8 is an enlarged elevation view of the outside face of a modified form of end cap for the housing assembly of FIG. 1.
Figure 9:
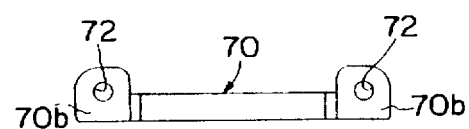
FIG. 9 is a top plan view of the modified end cap seen in FIG. 8.

As also discussed in this application's parent and as best seen in FIGS. 8 and 9, which depict a modified form of end cap 70 for the housing assembly, the housing assembly may be attached to a suitable support surface by means of the end caps 70 alone. As seen, the lower sides 70a of the end caps extend further down to terminate in the same plane as the lower wall of the mounting base section 12 and are provided with protruding shoulder portions 70b having openings 72 therethrough to receive suitable fastening means, such as screws of nails, to attach the end caps directly to a support surface for support of the housing assembly.

From the foregoing description of preferred embodiments of the invention, it can be seen that the housing assembly may be easily supportably attached to and assembled on a supporting surface for use. Utilizing the assembly and end cap construction shown in FIGS. 1, 2, 3, 5, 6, and 12, base support section 12 of the assembly first may be mounted on a receiving support surface by suitable fastening means, such as screws or nails, located in spaced openings 68 (FIG. 5) of the base section. Thereafter, the cover and central sections 24, 16 of the assembly with tubing and wiring may be attached in snap-fit frictional engagement with each other and to the previously mounted base support section 12, with the jumper wiring 50 and 52 supplying low voltage DC power to the transformer and tubing positioned in the channel of the base support section 12. If it is desired to attach the assembly to a support surface by using the modified form of end caps 70, a shown in FIGS. 8 and 9, the base, central, and cover sections and end caps 70 may be pre-assembled before mounting on a support surface, with all circuit and power supply wiring contained and hidden within the assembly housing. Thereafter, one or more housing assemblies are attached to a receiving surface by securing the end caps 70 thereto. End portions of the jumper wiring 50 are attached by either of jumper wiring sections 53 to a power supply line or to the next adjacent jumper wiring in an array of housing assemblies placed in end-to-end relation to establish illumination for a desired distance.

End caps of the housing assembly attached to the ends of the housing effectively seal the cover and central sections of the assembly, while the interconnecting short jumper wiring sections 53 between adjacent assemblies may be pushed into and located within the ends of the base plate channel 12, thus minimizing exposed lengths of wiring between interconnected housing assemblies of an array. By providing a high-voltage step-up transformer 44 in each housing assembly, power may be supplied to an array of assemblies from a single low voltage power source, e.g., 12 volt DC, thereby eliminating high-voltage wiring exposure between assemblies.

Figure 13:
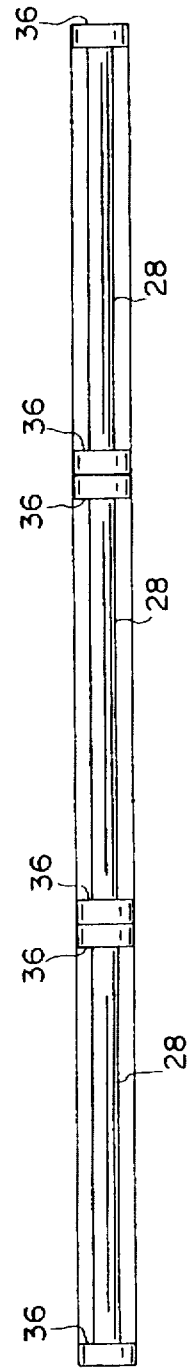
FIG. 13 is a view showing how the use of prior art opaque end caps result in a discontinuous appearance when multiple light units are used end-to-end.
Figure 14:
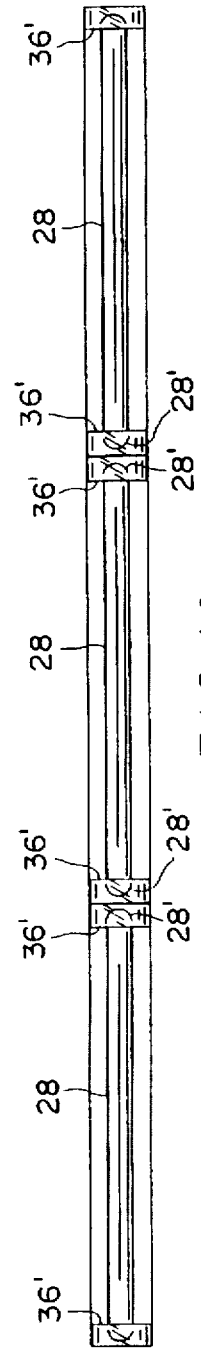
FIG. 14 is a view showing how the use of transparent and colorless end caps result in a continuous appearance when multiple light units are used side-by-side in series.

When multiple housing assemblies are used, it is advantageous to use an additional modification concerning end caps 36 and shown in FIG. 14. Typically, end caps 36 and foam rubber pad 66 have been made from a dark opaque material. This results in a discontinuous viewing effect when a plurality of light units are placed in end-to-end series because, as shown in FIG. 13, end caps 36 cause the individual glass tubings to look as if they are further away from each other than they actually are. However, by making end caps 36 transparent and colorless, when the series of lights are viewed from afar, they give the viewer the impression of one long continuous light. This is shown in FIG. 14. In FIG. 14, the viewer can see the ends 28' of glass tubing 28 through clear end caps 36 and gaskets (not shown). This makes the glass tubing look as close together as they actually are and give a more pleasing and continuous appearance.

If it is desired to program individual housing assemblies of the lighting array in an off-on blinking pattern, power and control circuit wiring from a remote control device may be run in parallel through one or more base plate channel section of the contiguous assemblies to supply power alternately to individual housing assemblies in the array, with power supply lines being contained within and protected by the housing assemblies, thereby substantially eliminating exposed wiring in the array.

Figure 15:
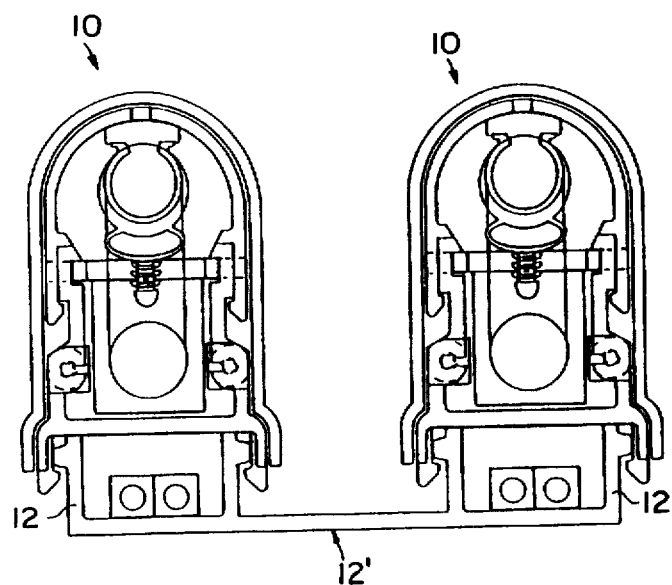
FIGS. 15, 16, 17, 18, and 19 show an alternative base structure in which the base has at least two channels for supporting two light units.
Figure 16:
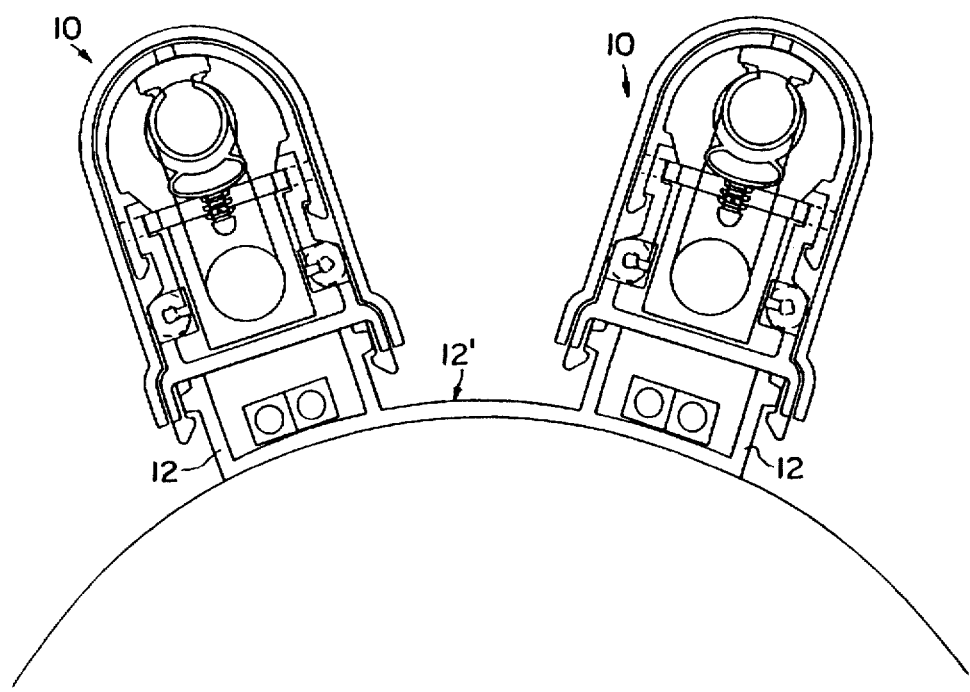
Figure 17:
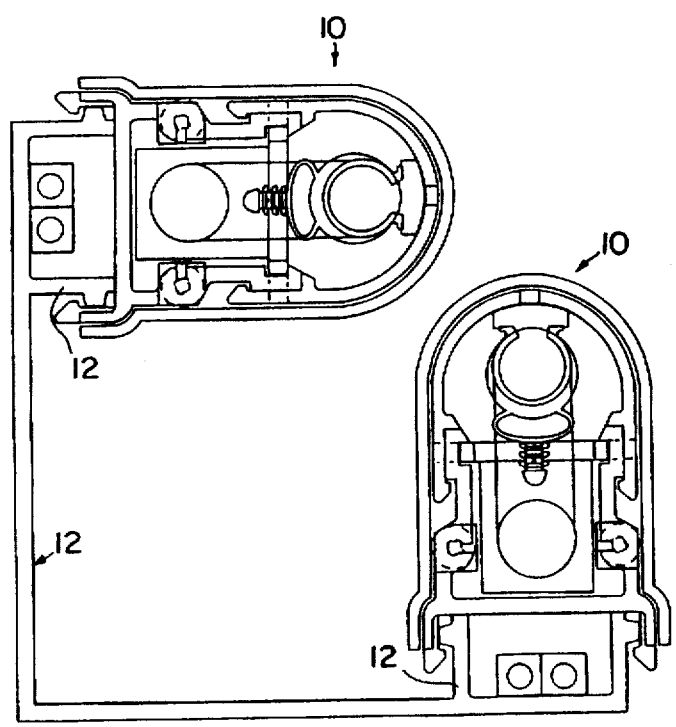
Figure 18:
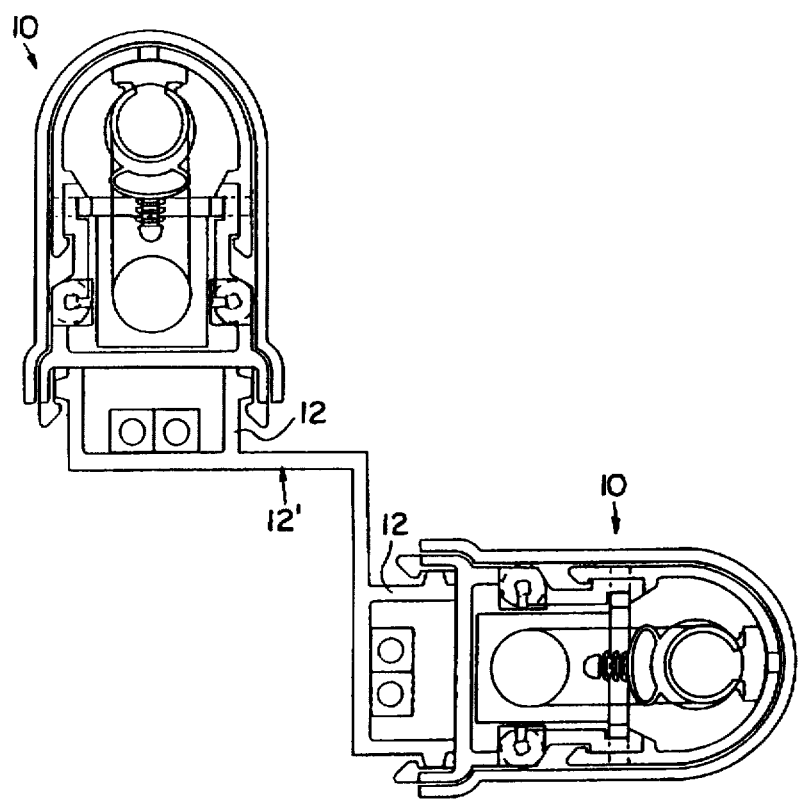
Figure 19:
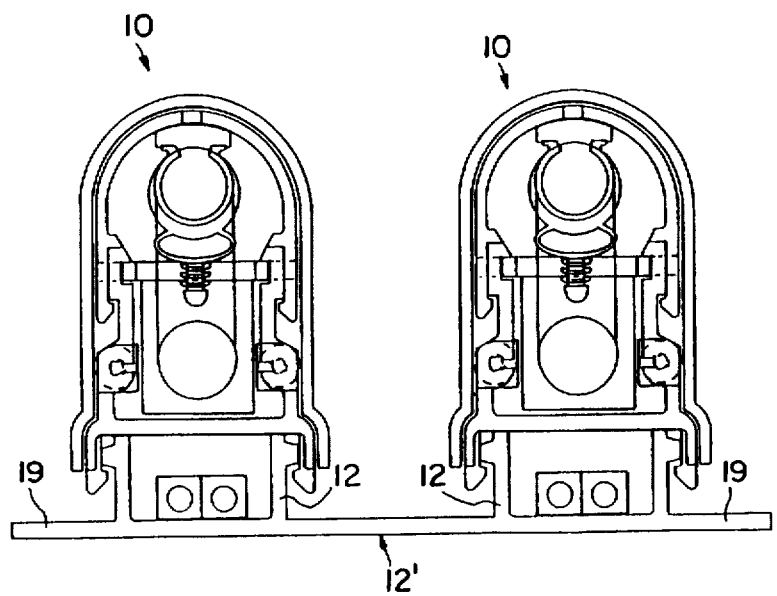

Finally, yet another improvement to the modular lighting system is as follows and concerns the mounting of multiple lighting systems in a parallel arrangement rather than (or in addition to) in series, as described above. As shown in FIG. 15, combined base 12' is constructed to have two parallel and individual bases 12 unitarilly formed a fixed distance apart. The user then mounts combined base 12' to the support surface and does not have to worry about separately mounting individual bases 12 to the support surface and maintaining them in parallel configuration. Combined base 12' could be made of a flexible material, as shown in FIG. 16, so that combined base 12' can be bent around a circular column. In other constructions, as shown in FIGS. 17 and 18, combined base 12' can be constructed from a rigid material as a right angle with each individual base 12 on its own leg. This shape is suitable for use with columns having right angles. Of course, any angle may be used based upon the support surface to which combined base 12' is to be mounted. Combined base section 12' can further comprise spacer portions 19 at its outermost ends and parallel to individual bases 12. Spacer elements can be used to mount multiple combined bases 12' in parallel configuration. Finally, any number or parallel bases 12 can be combined to form combined base 12'.

The construction arrangement of the component parts of the housing assemblies and their manner of interconnection permit ready disassembly and repair of a housing assembly array in field locations with ready removal and replacement of tubes and transformers of the individual assemblies by workmen needing no specialized or skilled training.

That which is claimed:

1. A housing assembly for protective support of illuminated glass tubing comprising:

a base section having wall portions forming an elongated channel having an open side;

a central section having wall portions forming an elongated channel having an open side and a light-transmitting cover section having wall portions forming an elongated channel having an open side, said central section secured to said cover section to form a light unit, said light unit being shorter than said base section;

an elongated support plate for glass tubing, said wall portions of said central section including means adjacent the open side of said central section channel for supportably receiving said support plate in the channel of said central section;

and said wall portions of the base section and said central section including means for securing said central section to said base section in snap-fit relation to close said open sides of said channels;

whereby said light unit is longitudinally positioned on said base section, the longitudinal position being variable based upon where on said base section said light unit is secured.

2. The housing assembly as defined in claim 1 wherein said base section is attached to a support surface independent of said light unit.

3. The housing assembly according to claim 2, wherein said base section is also attached to said support surface prior to placing said light unit adjacent said base section.

4. A housing assembly as defined in claim 1 wherein said means for securing said base and central sections of said assembly in snap-fit relation comprises expanded shoulders extending along said wall portions of said base section and projections adjacent the wall portion opposite the open side of the central section for snap-fit frictional engagement and retention on the expanded shoulders of the base section.

5. The housing assembly as defined in claim 1 wherein said base section:

further comprises holes for passing a fastener through for mounting said base section to a support surface having studs thereunder, said holes spaced apart by a predetermined distance.

6. The housing assembly as defined in claim 5 wherein said predetermined distance allows mounting said base to said studs whether the stud-to-stud distance is 16" or 24".

7. The housing assembly as defined in claim 6 wherein said predetermined distance is equal to 8 (eight) inches.

8. The housing assembly as defined in claim 1 including end caps fixed to adjacent end portions of said central and cover sections of the assembly, said end caps not extending into said channel of said base portion.

9. The housing assembly as defined in claim 1 including end caps fixed to adjacent end portions of said central and cover sections of the assembly, said end caps having spacer elements attached thereto to allow said channels of said central and cover assemblies to be partially open to the atmosphere.

10. The housing assembly as defined in claim 1 including end caps fixed to adjacent end portions of said central and cover sections of the assembly, said end caps being constructed out of a transparent and colorless material.

11. A plurality of housing assemblies as defined in claim 10 disposed in an end-to-end, substantially continuous, straight-line arrangement to define an array of assemblies, whereby said transparent and colorless end caps result in a continuous light effect.

12. A housing assembly for protective support of illuminated glass tubing comprising:

a base section having wall portions forming an elongated channel having an open side;

a central section having wall portions forming an elongated channel having an open side and a light-transmitting cover section having wall portions forming an elongated channel having an open side, said central section secured to said cover section to form a light unit, said light unit being shorter than said base section;

an elongated support plate for glass tubing, said wall portions of said central section including means for supportably receiving said support plate in the channel of said central section adjacent the open side of said central section channel;

and said wall portions of the base section and said central section including means for securing said central section to said base section in snap-fit relation to close said open sides of said channels;

whereby said light unit is longitudinally positioned on said base section, the longitudinal position being variable based upon where on said base section said light unit is secured;

said housing assembly further comprising a combined base section having wall portions forming at least two elongated channels each having an open side;

a light unit for each channel of said combined base, said light unit having a light transmitting cover section and a lower central section, said central section having wall portions forming an elongated channel having an open side; and wall portions of each of said channels of said combined base section and said central sections corresponding thereto, having means for securing said central sections corresponding to channels of said combined base section in snap-fit relation to close said open sides of said channels.

13. The housing of claim 12, wherein said at least two elongated channels of said combined base section are parallel to each other.

14. The housing of claim 12, wherein said combined base section is made from a flexible material.

15. The housing of claim 12, wherein said combined base section is made from a rigid material and has an angular configuration.

16. The housing of claim 15, wherein said angular configuration comprises a right angle.

17. The housing of claim 12, wherein said combined base section further comprises spacer portions at its outermost ends and parallel to said elongated channels.

\* \* \* \* \*